(12) United States Patent
Saito

(10) Patent No.: US 10,407,105 B2
(45) Date of Patent: Sep. 10, 2019

(54) VEHICLE LATERAL STRUCTURE

(71) Applicant: Toyota Jidosha Kabushiki Kaisha, Toyota-shi Aichi-ken (JP)

(72) Inventor: Kentaro Saito, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 95 days.

(21) Appl. No.: 15/824,652

(22) Filed: Nov. 28, 2017

(65) Prior Publication Data

US 2018/0162450 A1  Jun. 14, 2018

(30) Foreign Application Priority Data

Dec. 8, 2016 (JP) ................. 2016-238826

(51) Int. Cl.
  *B62D 25/02* (2006.01)
  *B62D 27/02* (2006.01)
(52) U.S. Cl.
  CPC ........... *B62D 25/025* (2013.01); *B62D 27/02* (2013.01)
(58) Field of Classification Search
  CPC ................. C25F 3/18; C25F 3/16; C25F 3/24
  USPC .......................... 296/193.06, 187.12, 203.03
  See application file for complete search history.

(56) References Cited

U.S. PATENT DOCUMENTS

| | | | | |
|---|---|---|---|---|
| 6,474,726 B1 * | 11/2002 | Hanakawa | ............. | B62D 25/04 |
| | | | | 296/187.12 |
| 9,457,844 B2 * | 10/2016 | Yoshida | ................. | B62D 25/04 |
| 10,279,844 B2 * | 5/2019 | Valencia Carrio | ..... | B62D 25/04 |
| 2010/0194146 A1 | 8/2010 | Nishimura et al. | | |
| 2011/0304175 A1 | 12/2011 | Mori | | |
| 2014/0028056 A1 | 1/2014 | Nishimura et al. | | |
| 2014/0145468 A1 * | 5/2014 | Takizawa | ............. | B62D 21/157 |
| | | | | 296/187.12 |
| 2014/0232138 A1 | 8/2014 | Kanaguichi et al. | | |
| 2014/0339855 A1 * | 11/2014 | Torii | ...................... | B62D 25/04 |
| | | | | 296/193.06 |

FOREIGN PATENT DOCUMENTS

| | | |
|---|---|---|
| JP | H0672787 U | 10/1994 |
| JP | 2005-313685 A | 11/2005 |
| JP | 2010-173562 A | 8/2010 |
| JP | 2014-024467 A | 2/2014 |
| JP | 2015-074239 A | 4/2015 |
| WO | 2010/100717 A1 | 9/2010 |
| WO | 2013/077200 A1 | 5/2013 |

* cited by examiner

*Primary Examiner* — Jason S Morrow
*Assistant Examiner* — E Turner Hicks
(74) *Attorney, Agent, or Firm* — Dinsmore & Shohl LLP

(57) ABSTRACT

Front and rear lateral wall portions extend inward in a width direction of a vehicle from edges of an outer wall portion of a pillar outer member in a vehicle longitudinal direction, respectively. Flange portions extend outward in the vehicle longitudinal direction from inner edges of the front and rear lateral wall portions in the width direction, respectively. The front and rear lateral wall portions are equipped with flexion regions having outer parts that are flexed at non-end portions thereof in the width direction and that are located outside ridge lines of flexion thereof in the width direction, and inner parts that are located inside the ridge lines in the width direction, respectively. In the flexion regions, the ridge lines are located within half of a range from the flange portions to the outer wall portion in the width direction, respectively.

4 Claims, 6 Drawing Sheets

VEHICLE LATERAL STRUCTURE

CROSS-REFERENCE TO RELATED APPLICATIONS

This application claims priority to Japanese Patent Application No. 2016-238826 filed on Dec. 8, 2016, which is incorporated herein by reference in its entirety including the specification, drawings and abstract.

BACKGROUND

1. Technical Field

The disclosure relates to a vehicle lateral structure.

2. Description of Related Art

A vehicle lateral structure described in WO 2010/100717 is equipped with a pillar outer member that extends from a lower side of a vehicle toward an upper side of the vehicle, and a pillar inner member that is arranged opposite the pillar outer member and inside the pillar outer member in a vehicle width direction. Besides, in the vehicle lateral structure described in WO 2010/100717, the pillar outer member is equipped with a plate-shaped outer wall portion that is opposed to the pillar inner member. Lateral wall portions extend inward in the vehicle width direction from edges of the outer wall portion in a longitudinal direction of the vehicle respectively. Then, flange portions extend outward in the longitudinal direction of the vehicle from inner edges of the lateral wall portions in the vehicle width direction, respectively. Then, inner surfaces of these flange portions in the vehicle width direction are fixed to the pillar inner member through welding.

SUMMARY

When a load is applied to the vehicle lateral structure described in WO 2010/100717 from outside in the vehicle width direction, the load is also transmitted to the flange portions, that is, the locations where the pillar outer member is fixed to the pillar inner member, via the outer wall portion and lateral wall portions of the pillar outer member. Then, when the load that is applied to the pillar outer member has a certain magnitude or the load is applied thereto in a certain direction, it may be impossible to appropriately absorb an impact due to the concentration of the load on locations where the flange portions of the pillar outer member are welded to the pillar inner member and the rupture of welding points. Therefore, there is further room for improvement in absorption of impact energy at a lateral portion of the vehicle.

A first aspect of the disclosure relates to a vehicle lateral structure. The vehicle lateral structure includes: a pillar outer member that extends from a lower side of a vehicle toward an upper side of the vehicle; and a pillar inner member that is arranged opposite the pillar outer member in a vehicle width direction, wherein the pillar outer member includes a plate-shaped outer wall portion that is opposed to the pillar inner member and that extends from the lower side of the vehicle toward the upper side of the vehicle, a front lateral wall portion that extends inward in the vehicle width direction from a front edge of the outer wall portion in a longitudinal direction of the vehicle, a rear lateral wall portion that extends inward in the vehicle width direction from a rear edge of the outer wall portion in the longitudinal direction of the vehicle, a front flange portion that extends forward in the longitudinal direction of the vehicle from an inner edge of the front lateral wall portion in the vehicle width direction, and whose inner surface in the vehicle width direction is fixed to the pillar inner member, and a rear flange portion that extends backward in the longitudinal direction of the vehicle from an inner edge of the rear lateral wall portion in the vehicle width direction, and whose inner surface in the vehicle width direction is fixed to the pillar inner member, the front lateral wall portion is equipped with a front flexion region that is flexed at a non-end portion thereof in the vehicle width direction and that has a front outer part located outside a ridge line of flexion thereof in the vehicle width direction, and a front inner part located inside the ridge line in the vehicle width direction, the rear lateral wall portion is equipped with a rear flexion region that is flexed at a non-end portion thereof in the vehicle width direction and that has a rear outer part located outside a ridge line of flexion thereof in the vehicle width direction, and a rear inner part located inside the ridge line in the vehicle width direction, the ridge line in the front flexion region is located within a half range on a side of the front flange, namely, within half of a range from the front flange portion to the outer wall portion in the vehicle width direction, and the ridge line in the rear flexion region is located within half of a range from the rear flange portion to the outer wall portion in the vehicle width direction.

A second aspect of the disclosure relates to a vehicle lateral structure. The vehicle lateral structure includes: a pillar inner member that extends from a lower side of a vehicle toward an upper side of the vehicle; a pillar outer member that is arranged opposite the pillar inner member in a width direction of the vehicle, wherein the pillar outer member includes a plate-shaped outer wall portion that is opposed to the pillar inner member and that extends from the lower side of the vehicle toward the upper side of the vehicle, a front lateral wall portion that extends from a front edge of the outer wall portion in a longitudinal direction of the vehicle toward the pillar inner member in the width direction, a rear lateral wall portion that extends from a rear edge of the outer wall portion in the longitudinal direction toward the pillar inner member in the width direction, a front flange that extends forward in the longitudinal direction from an end portion of the front lateral wall portion on the pillar inner member side in the width direction, and that is fixed to the pillar inner member, and a rear flange that extends backward in the longitudinal direction from an end portion of the rear lateral wall portion on the pillar inner member side in the width direction, and that is fixed to the pillar inner member, at least one of the front lateral wall portion and the rear lateral wall portion has a flexion portion that is flexed at a non-end portion thereof in the width direction, and a ridge line of the flexion portion is located closer to the front flange or the rear flange than the outer wall portion in the width direction.

According to the above aspects, when a load is applied to the pillar outer member from outside in the vehicle width direction, each of the lateral wall portions bends along the ridge line in the flexion region. Then, the position of this ridge line is located on each flange portion side (inside in the vehicle width direction). Therefore, when a load is applied to the pillar outer member from outside in the vehicle width direction, the inner part that is located inside the ridge line in the vehicle width direction deforms first before the completion of deformation of the outer part that is located outside the ridge line in the vehicle width direction, and is likely to abut on, for example, the pillar inner member that is arranged inside the pillar outer member in the vehicle width direction. If the inner part that is located inside the ridge line abuts on another member, the load can be transmitted to that member via a location of the abutment, so the load can be restrained from excessively concentrating on each of the flange portions of the pillar outer member that is welded at welding locations thereof to the pillar inner member. As a result, the welding point can be restrained from rupturing at each of the flange portions.

In the above aspects, the pillar outer member may be equipped, in part of a lower side thereof in a vertical direction of the vehicle, with a skirt portion that is extended in a shape of an arc in such a manner as to be located outward in the longitudinal direction of the vehicle as the front lateral wall portion and the rear lateral wall portion extend downward, and the front flexion region and the rear flexion region may be provided at the skirt portion in the vertical direction of the vehicle.

In the aforementioned configuration, when a load is applied to the pillar outer member from outside in the vehicle width direction, the pillar outer member may bend at any location in the vertical direction thereof. In general, an upper part of the pillar outer member is ensured of a corresponding strength to suppress deformation. On the other hand, according to the aforementioned configuration, the flexion region is provided at the skirt portion on the lower side of the pillar outer member, and this flexion region is likely to serve as a point of origin of bending. Accordingly, even in the case where a load is applied to the pillar outer member from outside in the vehicle width direction, the pillar outer member is likely to bend inward in the vehicle width direction at the skirt portion on the lower side of the pillar outer member, and the pillar outer member deforms such that the lower side thereof swings inward in the vehicle width direction. As a result, even when the pillar outer member deforms to bend, the upper side of a vehicle interior can be restrained from narrowing.

In the above aspects, the front inner part may be located inward in the vehicle width direction and forward in the longitudinal direction of the vehicle, with respect to the front outer part, and the rear inner part may be located inward in the vehicle width direction and backward in the longitudinal direction of the vehicle, with respect to the rear outer part.

According to the aforementioned configuration, when each of the lateral wall portions bends due to the application of a load to the pillar outer member from outside in the vehicle width direction, the ridge line serving as a border between the outer part and the inner part bends in such a manner as to protrude inward of the pillar outer member. Therefore, when each of the lateral wall portions of the pillar outer member bends, the bent lateral wall portion can be restrained from interfering with another object therearound.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

Figure 1:
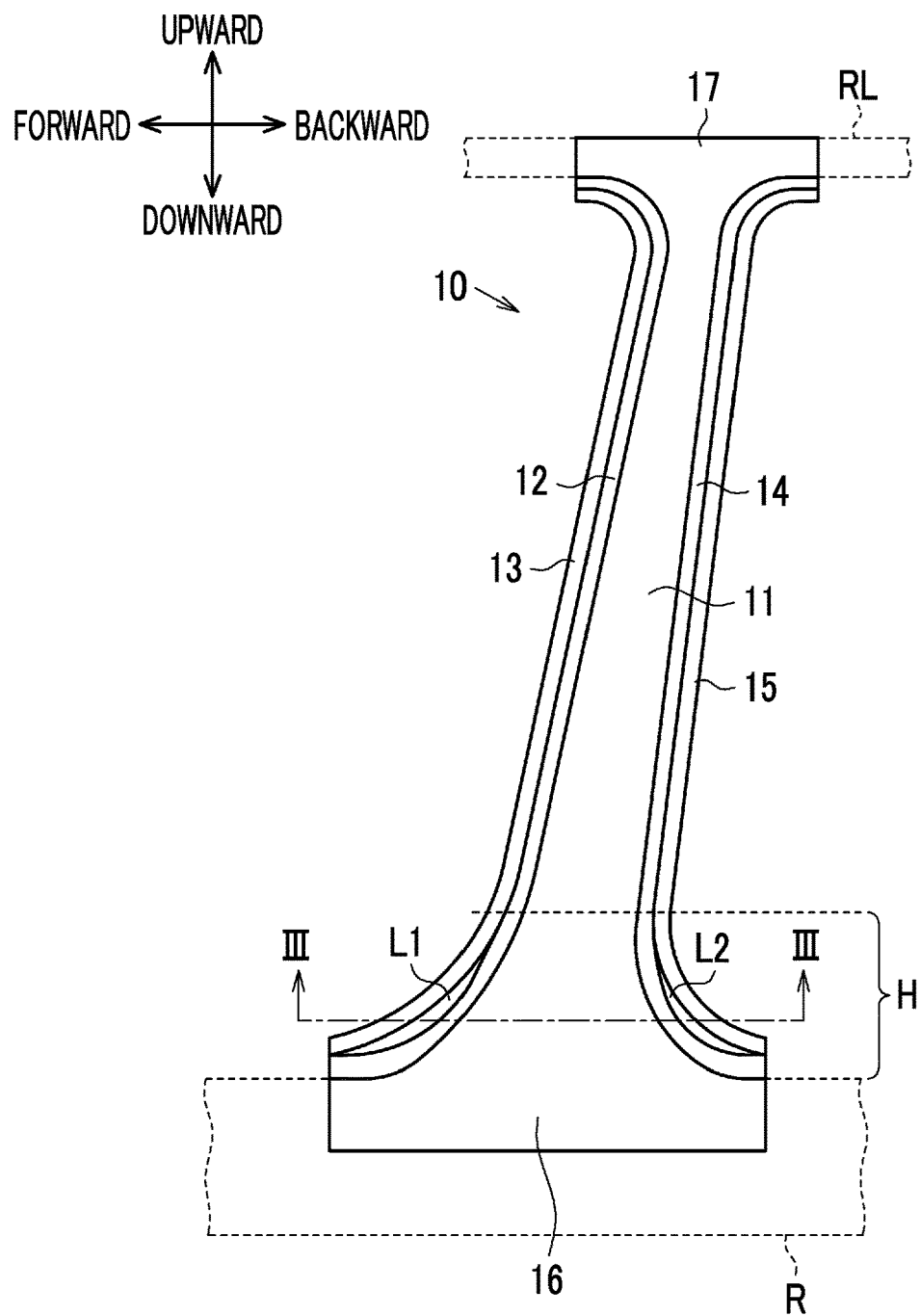
FIG. 1 is a lateral view of a vehicle lateral structure.
Figure 2:
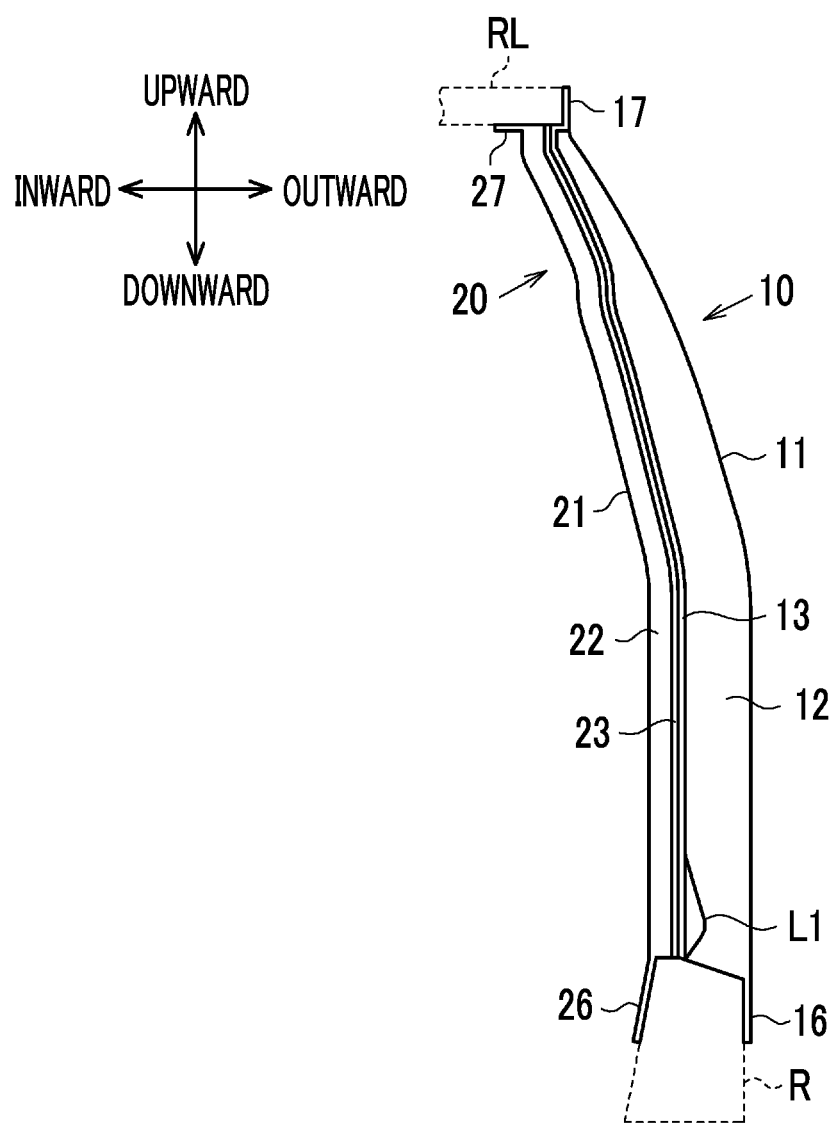
FIG. 2 is a front view of the vehicle lateral structure.

A vehicle lateral structure according to the present embodiment of the disclosure will be described hereinafter. As shown in FIG. 1, a pillar outer member 10 of the vehicle lateral structure extends from a lower side of a vehicle toward an upper side of the vehicle. A lower end portion of the pillar outer member 10 is fixed to a substantially square cylinder-shaped rocker portion R that extends in a longitudinal direction on a lower end side of a vehicle lateral portion. An upper end portion of the pillar outer member 10 is fixed to a rail outer piece RL that supports a top board of the vehicle. As shown in FIG. 2, a pillar inner member 20 is arranged opposite the pillar outer member 10 and inside the pillar outer member 10 in the vehicle width direction. As is the case with the pillar outer member 10, a lower end portion of the pillar inner member 20 is fixed to the rocker portion R, and an upper end portion of the pillar inner member 20 is fixed to the rail outer piece RL.

Figure 3:
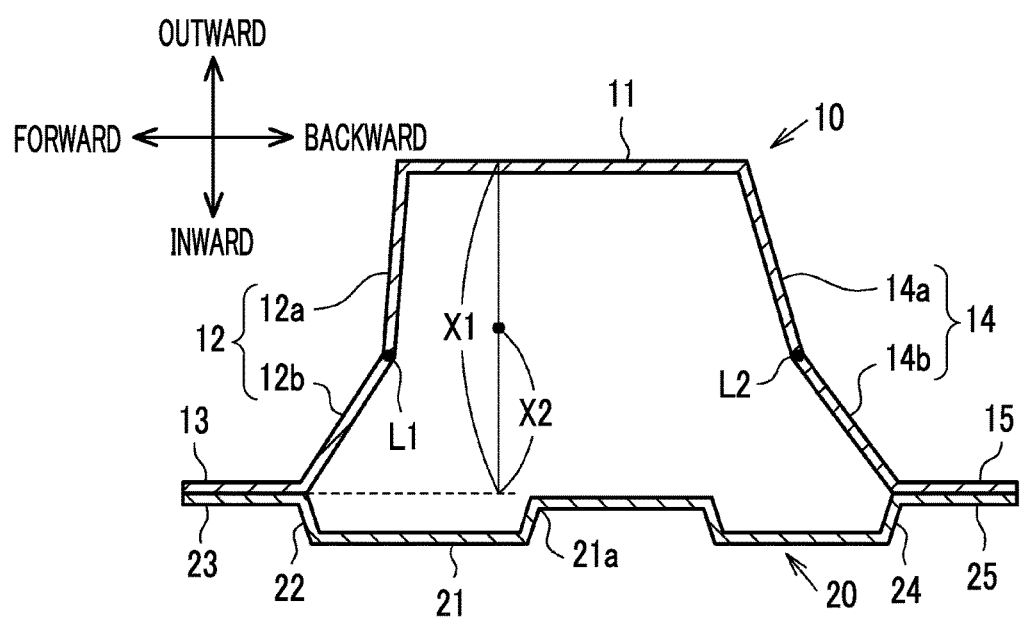
FIG. 3 is a cross-sectional view taken along a line III-III in FIG. 1.

As shown in FIG. 3, the pillar outer member 10 is equipped with a plate-shaped outer wall portion 11 that is opposed to the pillar inner member 20 and that extends from the lower side of the vehicle toward the upper side of the vehicle. As shown in FIG. 2, a substantially lower half region of the outer wall portion 11 extends substantially in a vertical direction of the vehicle. Besides, a substantially upper half region of the outer wall portion 11 is curved in such a manner as to extend upward and inward in the vehicle width direction.

As shown in FIG. 1, a part that belongs to a lower side of the pillar outer member 10 and that is located within a predetermined range above the rocker portion R is a skirt portion H. At this skirt portion H, the width of the outer wall portion 11 in the longitudinal direction of the vehicle increases downward with respect to the vehicle. Besides, at this skirt portion H, the rate of increase in the width of the outer wall portion 11 in the longitudinal direction of the vehicle increases downward with respect to the vehicle. That is, at the skirt portion H of the pillar outer member 10, each of edges of the outer wall portion 11 in the longitudinal direction of the vehicle extends in the shape of an arc in such a manner as to be located downward and gradually outward in the longitudinal direction of the vehicle.

At a central portion of the pillar outer member 10 in the vertical direction of the vehicle, above the skirt portion H, the width of the outer wall portion 11 in the longitudinal direction of the vehicle slightly decreases upward with respect to the vehicle. In this part, the rate of decrease in the width of the outer wall portion 11 in the longitudinal direction of the vehicle is constant, and the edges of the outer wall portion 11 in the longitudinal direction of the vehicle rectilinearly extend. At the upper end portion of the pillar outer member 10, the width of the outer wall portion 11 in the longitudinal direction of the vehicle increases upward with respect to the vehicle. Besides, in this part, the rate of increase in the width in the longitudinal direction of the vehicle increases upward with respect to the vehicle. That is, in part of an upper side of the outer wall portion 11 in the vertical direction of the vehicle, each of the edges of the outer wall portion 11 in the longitudinal direction of the vehicle extends in the shape of an arc in such a manner as to be located upward and gradually outward in the longitudinal direction of the vehicle.

As shown in FIG. 3, a front lateral wall portion 12 extends inward in the vehicle width direction (toward the pillar inner member 20) from the front edge of the outer wall portion 11 with respect to the vehicle. The front lateral wall portion 12 is provided over an entire area in a direction in which the outer wall portion 11 is extended. Besides, the front lateral wall portion 12 is inclined, as a whole, in such a manner as to be located inward in the vehicle width direction and forward with respect to the vehicle. A flange portion 13 extends forward with respect to the vehicle from an inner edge of the front lateral wall portion 12 in the vehicle width direction. The flange portion 13 is provided over an entire area in a direction in which the front lateral wall portion 12 is extended.

A rear lateral wall portion 14 extends inward in the vehicle width direction from the rear edge of the outer wall portion 11 with respect to the vehicle. The rear lateral wall portion 14 is provided over an entire area in a direction in which the outer wall portion 11 is extended. Besides, the rear lateral wall portion 14 is inclined, as a whole, in such a manner as to be located inward in the vehicle width direction and backward with respect to the vehicle. A flange portion 15 extends backward with respect to the vehicle from an inner edge of the rear lateral wall portion 14 in the vehicle width direction. The flange portion 15 is provided over an entire area in a direction in which the rear lateral wall portion 14 is extended. Incidentally, the front lateral wall portion 12 and the rear lateral wall portion 14 are equivalent to a pair of lateral wall portions that extend inward in the vehicle width direction from the edges of the outer wall portion 11 in the longitudinal direction of the vehicle, respectively.

As shown in FIG. 1, at the skirt portion H of the pillar outer member 10 as well, the front lateral wall portion 12 and the rear lateral wall portion 14 are extended along the directions in which the respective edges of the outer wall portion 11 in the longitudinal direction of the vehicle are extended, respectively. That is, at the skirt portion H, each of the front lateral wall portion 12 and the rear lateral wall portion 14 is extended in the shape of an arc in such a manner as to be located downward with respect to the vehicle and outward in the longitudinal direction of the vehicle.

A lower wall portion 16 extends downward from a lower end edge of the outer wall portion 11 of the pillar outer member 10. The lower wall portion 16 assumes the shape of a rectangle that is long in the longitudinal direction of the vehicle, in a lateral view. As shown in FIG. 2, an inner surface of the lower wall portion 16 in the vehicle width direction is in surface contact with an outer surface of the rocker portion R in the vehicle width direction. Both the surfaces are fixed to each other through welding.

As shown in FIG. 1, an upper wall portion 17 extends upward from an upper end edge of the outer wall portion 11 of the pillar outer member 10. The upper wall portion 17 assumes the shape of a rectangle that is long in the longitudinal direction of the vehicle in a lateral view. As shown in FIG. 2, an inner surface of the upper wall portion 17 in the vehicle width direction is in surface contact with an outer surface of the rail outer piece RL in the vehicle width direction. Both the surfaces are fixed to each other through welding.

As shown in FIG. 3, the pillar inner member 20 is equipped with a plate-shaped inner wall portion 21 that is opposed to the outer wall portion 11 of the pillar outer member 10 and that extends from the lower side of the vehicle toward the upper side of the vehicle. As shown in FIG. 2, a substantially lower half part of the inner wall portion 21 extends substantially in the vertical direction of the vehicle, parallel to the outer wall portion 11 of the pillar outer member 10. Besides, a substantially upper half part of the inner wall portion 21 is curved upward and inward in the vehicle width direction.

The width of the inner wall portion 21 in the longitudinal direction of the vehicle is equal to that of the outer wall portion 11 of the pillar outer member 10. That is, at the skirt portion H of the pillar outer member 10, the width of the inner wall portion 21 in the longitudinal direction of the vehicle increases downward with respect to the vehicle, and the rate of increase therein also increases downward with respect to the vehicle. Besides, at a central portion of the pillar inner member 20 in the vertical direction of the vehicle, above the skirt portion H, the width of the inner wall portion 21 in the longitudinal direction of the vehicle slightly decreases upward with respect to the vehicle. Then, at the upper end portion of the pillar inner member 20, the width of the inner wall portion 21 in the longitudinal direction of the vehicle increases upward with respect to the vehicle, and the rate of increase therein also increases upward with respect to the vehicle.

A protrusion strip portion 21a that protrudes outward in the vehicle width direction is provided at a central portion of the inner wall portion 21 in the longitudinal direction of the vehicle. The protrusion strip portion 21a assumes the shape of a quadrangle in a cross-sectional view. The protrusion strip portion 21a is provided substantially over the entirety of the inner wall portion 21 in the vertical direction of the vehicle.

As shown in FIG. 3, a front lateral wall portion 22 extends outward in the vehicle width direction (toward the pillar outer member 10) from a front edge of the inner wall portion 21 with respect to the vehicle. The front lateral wall portion 22 is provided over an entire area in a direction in which the inner wall portion 21 is extended. The length of the front lateral wall portion 22 in the vehicle width direction is shorter than the length of the front lateral wall portion 12 of the pillar outer member 10 in the vehicle width direction. A flange portion 23 extends forward with respect to the vehicle from an inner edge of the front lateral wall portion 22 of the pillar inner member 20 in the vehicle width direction. The flange portion 23 is provided over an entire area in a direction in which the front lateral wall portion 22 is extended. The flange portion 23 is arranged opposite the flange portion 13 of the pillar outer member 10. An outer surface of the flange portion 23 in the vehicle width direction is fixed to an inner surface of the flange portion 13 of the pillar outer member 10 in the vehicle width direction through welding.

As shown in FIG. 3, a rear lateral wall portion 24 extends outward in the vehicle width direction from a rear edge of the inner wall portion 21 with respect to the vehicle. The rear lateral wall portion 24 is provided over an entire area in a direction in which the inner wall portion 21 is extended. The length of the rear lateral wall portion 24 in the vehicle width direction is shorter than the length of the rear lateral wall portion 14 of the pillar outer member 10 in the vehicle width direction. A flange portion 25 extends backward with respect to the vehicle from an inner edge of the rear lateral wall portion 24 of the pillar inner member 20 in the vehicle width direction. The flange portion 25 is provided over an entire area in a direction in which the rear lateral wall portion 24 is extended. The flange portion 25 is arranged opposite the flange portion 15 of the pillar outer member 10. An outer surface of the flange portion 25 in the vehicle width direction is fixed to an inner surface of the flange portion 15 of the pillar outer member 10 in the vehicle width direction through welding.

As shown in FIG. 2, a lower wall portion 26 extends downward from a lower end edge of the inner wall portion 21 of the pillar inner member 20. The lower wall portion 26 assumes the shape of a rectangle that is long in the longitudinal direction of the vehicle in a lateral view. An outer surface of the lower wall portion 16 in the vehicle width direction is in surface contact with an inner surface of the rocker portion R in the vehicle width direction. Both the surfaces are fixed to each other through welding. An upper wall portion 27 extends inward in the vehicle width direction from the upper end edge of the outer wall portion 11 of the pillar outer member 10. An upper surface of the upper wall portion 27 is in surface contact with a lower surface of the rail outer piece RL. Both the surfaces are fixed to each other through welding.

As shown in FIG. 3, the front lateral wall portion 12 of the pillar outer member 10 is flexed at a non-end portion thereof in the vehicle width direction, and is equipped with a flexion region having an outer part 12a located outside a ridge line L1 of flexion thereof in the vehicle width direction, and an inner part 12b located inside the ridge line L1 in the vehicle width direction. The inner part 12b of the front lateral wall portion 12 is inclined with respect to the outer part 12a to which the inner part 12b is connected via the ridge line L1, in such a manner as to be located inward in the vehicle width direction and forward with respect to the vehicle. In this embodiment of the disclosure, as shown in FIG. 1, the flexion region (the ridge line L1) of the front lateral wall portion 12 is provided only at the skirt portion H of the pillar outer member 10, and is not provided at the other parts of the pillar outer member 10 in the vertical direction of the vehicle.

As shown in FIG. 1, the ridge line L1 of the front lateral wall portion 12 is located toward a center of the flexion region (the skirt portion H) in the vertical direction and outward in the vehicle width direction (toward the front edge of the outer wall portion 11 with respect to the vehicle in FIG. 1). Then, the ridge line L1 is located upward or downward from a central portion of the flexion region (the skirt portion H) and inward in the vehicle width direction. Then, end portions of the ridge line L1 in the vertical direction of the vehicle stretch as far as a borderline between the front lateral wall portion 12 and the flange portion 13, and the ridge line L1 is not formed outside that location in the vertical direction of the vehicle. Besides, as shown in FIG. 3, the ridge line L1 at the front lateral wall portion 12 is located within a half range X2 on the flange portion 13 side and the flange portion 15 side, namely, within half of a range X1 from the flange portion 13 and the flange portion 15 to the outer wall portion 11 in the vehicle width direction, even at a location located most outside in the vehicle width direction.

As shown in FIG. 3, the rear lateral wall portion 14 is equipped with an outer part 14a that is flexed at a non-end portion thereof in the vehicle width direction and that is located outside a ridge line L2 of flexion thereof in the vehicle width direction, and an inner part 14b that is located inside the ridge line L2 in the vehicle width direction. The inner part 14b of the rear lateral wall portion 14 is inclined with respect to the outer part 14a to which the inner part 14b is connected via the ridge line L1, in such a manner as to be located inward in the vehicle width direction and backward with respect to the vehicle. Incidentally, in this embodiment of the disclosure, as shown in FIG. 1, the flexion region (the ridge line L2) of the rear lateral wall portion 14 is provided only at the skirt portion H of the pillar outer member 10, and is not provided at the other parts of the pillar outer member 10 in the vertical direction of the vehicle.

As shown in FIG. 1, the ridge line L2 of the rear lateral wall portion 14 is located toward the center of the flexion region (the skirt portion H) in the vertical direction and outward in the vehicle width direction (toward the rear edge of the outer wall portion 11 with respect to the vehicle in FIG. 1). Then, the ridge line L2 is located upward or downward from the central portion of the flexion region (the skirt portion H) and inward in the vehicle width direction. Then, end portions of the ridge line L2 in the vertical direction of the vehicle stretch as far as a borderline between the rear lateral wall portion 14 and the flange portion 15, and the ridge line L2 is not formed outside that location in the vertical direction of the vehicle. Besides, as shown in FIG. 3, the ridge line L2 at the rear lateral wall portion 14 is located within the half range X2 on the flange portion 13 side and the flange portion 15S side, namely, within half of the range X1 from the flange portion 13 and the flange portion 15 to the outer wall portion 11 in the vehicle width direction, even at a location located most outside in the vehicle width direction. The position of the ridge line L2 of the rear lateral wall portion 14 in the vehicle width direction (the position thereof in the vertical direction in FIG. 3) is the same as the position of the ridge line L1 of the front lateral wall portion 12 in the vehicle width direction, in a cross-sectional view of the pillar outer member 10 along a cross-section perpendicular to the vertical direction of the vehicle.

The operation and effect of the vehicle lateral structure configured as described above will be described. First of all, a hypothetical case where the front lateral wall portion 12 and the rear lateral wall portion 14 of the pillar outer member 10 are not flexed at non-end portions thereof and the ridge line L1 and the ridge line L2 are not formed will be described.

Figure 4:
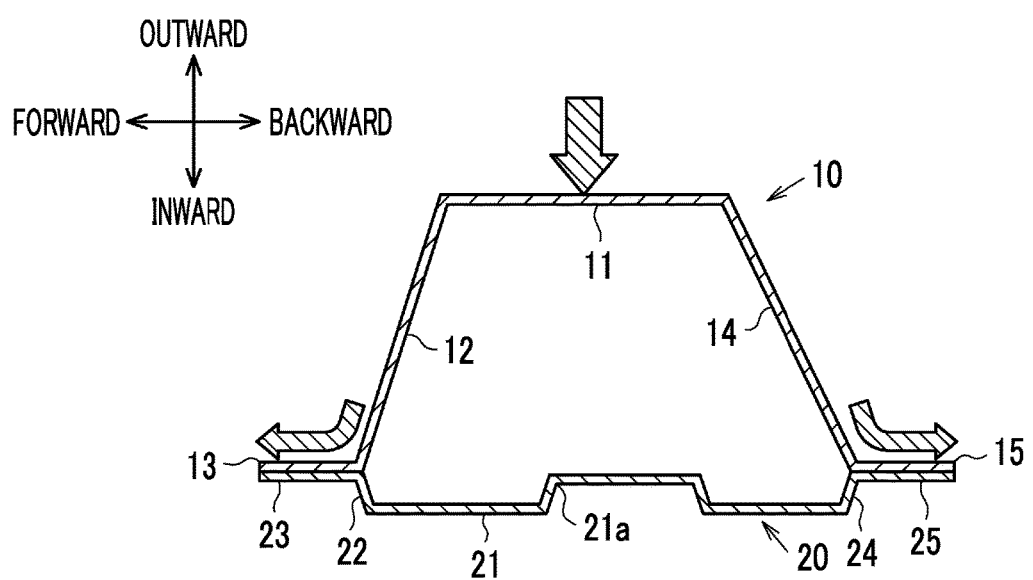
FIG. 4 is a cross-sectional view showing a mode of transmission of a load in the case where a front lateral wall portion and a rear lateral wall portion have no ridge line.

As shown in FIG. 4, in the case where a load is applied to the outer wall portion 11 of the pillar outer member 10 from outside in the vehicle width direction, the load is transmitted to the flange portion 13 via the front lateral wall portion 12, and is transmitted to the flange portion 15 via the rear lateral wall portion 14. It should be noted herein that the front lateral wall portion 12 and the rear lateral wall portion 14 extend inward in the vehicle width direction and outward in the longitudinal direction of the vehicle. In other words, the front lateral wall portion 12 extends inward in the vehicle width direction and forward in the longitudinal direction of the vehicle. Also, the rear lateral wall portion 14 extends inward in the vehicle width direction and backward in the longitudinal direction of the vehicle. Accordingly, when a load is applied to the outer wall portion 11 from outside in the vehicle width direction, a force acts in such a manner as to move an inner end portion of the front lateral wall portion 12 in the vehicle width direction and an inner end portion of the rear lateral wall portion 14 in the vehicle width direction outward in the longitudinal direction of the vehicle, as indicated by arrows in FIG. 4. Then, the flange portion 13 and the flange portion 15 of the pillar outer member 10 are about to move outward in the longitudinal direction of the vehicle with respect to the pillar inner member 20. In the case where the load that is applied to the outer wall portion 11 of the pillar outer member 10 has a certain magnitude or the load is applied thereto in a certain direction, the load may concentrate on the flange portion 13 and the flange portion 15 of the pillar outer member 10. In this case, a welding point may rupture at a location where the flange portion 13 of the pillar outer member 10 and the flange portion 23 of the pillar inner member 20 are welded to each other, or at a location where the flange portion 15 of the pillar outer member 10 and the flange portion 25 of the pillar inner member 20 are welded to each other. If the welding point ruptures, the pillar outer member 10 and the pillar inner member 20 partially separate from each other and cannot exert an expected strength.

Figure 5:
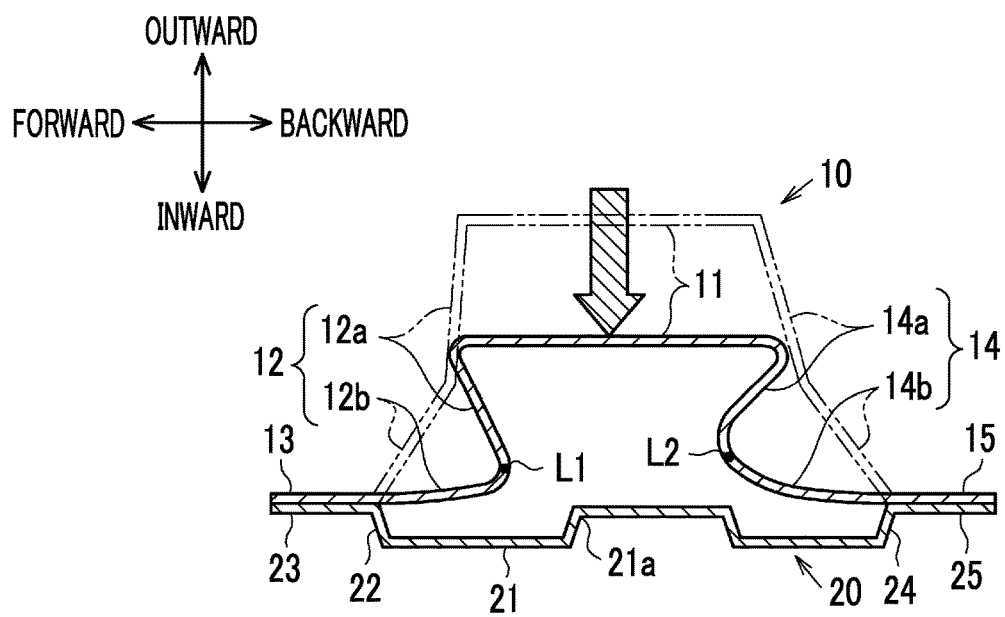
FIG. 5 is a cross-sectional view showing a mode of deformation of a pillar outer member at the time when a load is applied to the vehicle lateral structure according to the embodiment of the disclosure from outside in a vehicle width direction.

In the vehicle lateral structure according to the aforementioned embodiment of the disclosure, the front lateral wall portion 12 of the pillar outer member 10 is flexed at the non-end portion thereof in the vehicle width direction, and the ridge line L1 is formed. Besides, the rear lateral wall portion 14 of the pillar outer member 10 is flexed at the non-end portion thereof in the vehicle width direction, and the ridge line L2 is formed. Accordingly, as shown in FIG. 5, when a load is applied to the outer wall portion 11 of the pillar outer member 10 from outside in the vehicle width direction, the front lateral wall portion 12 bends along the ridge line L1, and the rear lateral wall portion 14 bends along the ridge line L2. In this manner, part of the load applied to the outer wall portion 11 of the pillar outer member 10 is consumed as a load for bending the front lateral wall portion 12 and the rear lateral wall portion 14. Therefore, the load that is applied to the flange portion 13 and the flange portion 15 can be made small.

Besides, in the aforementioned embodiment of the disclosure, the ridge line L1 of the front lateral wall portion 12 and the ridge line L2 of the rear lateral wall portion 14 are located within the half range X2 on the flange portion 13 side and the flange portion 15 side respectively, namely, within half of the range X1 from the flange portion 13 and the flange portion 15 to the outer wall portion 11 in the vehicle width direction respectively. Therefore, when the front lateral wall portion 12 and the rear lateral wall portion 14 deform through the application of a load to the outer wall portion 11 from outside in the vehicle width direction, the inner part 12b of the front lateral wall portion 12 and the inner part 14b of the rear lateral wall portion 14 are likely to finish deforming before the completion of deformation of the outer part 12a of the front lateral wall portion 12 and the outer part 14a of the rear lateral wall portion 14. Then, when the inner part 12b of the front lateral wall portion 12 and the inner part 14b of the rear lateral wall portion 14 finish deforming, these inner parts 12b and 14b abut on the inner wall portion 21 of the pillar inner member 20. In this state, even when a load is further applied from outside in the vehicle width direction, the load can be transmitted to the pillar inner member 20 via locations where the inner parts 12b and 14b abut on the inner wall portion 21 of the pillar inner member 20. As a result, the load that is applied to the flange portion 13 and the flange portion 15 can be made small. Incidentally, in FIG. 5, the pillar outer member 10 that has not deformed yet is indicated by virtual lines.

In the aforementioned embodiment of the disclosure, at the front lateral wall portion 12, the inner part 12b is inclined with respect to the outer part 12a in such a manner as to be located inward in the vehicle width direction and forward with respect to the vehicle. By the same token, at the rear lateral wall portion 14, the inner part 14b is inclined with respect to the outer part 14a in such a manner as to be located inward in the vehicle width direction and backward with respect to the vehicle. According to this mode of flexion of the front lateral wall portion 12 and the rear lateral wall portion 14, when the front lateral wall portion 12 bends due to a load from outside in the vehicle width direction, the ridge line L1 as a border between the outer part 12a and the inner part 12b bends in such a manner as to protrude backward, as shown in FIG. 5. Besides, by the same token, when the rear lateral wall portion 14 bends due to a load from outside in the vehicle width direction, the ridge line L2 as a border between the outer part 14a and the inner part 14b bends in such a manner as to protrude forward. In this manner, the front lateral wall portion 12 and the rear lateral wall portion 14 bend in such a manner as to protrude inward of the pillar outer member 10. Therefore, the bent front lateral wall portion 12 and the bent rear lateral wall portion 14 can be restrained from interfering with other objects around the pillar outer member 10.

Figure 6:
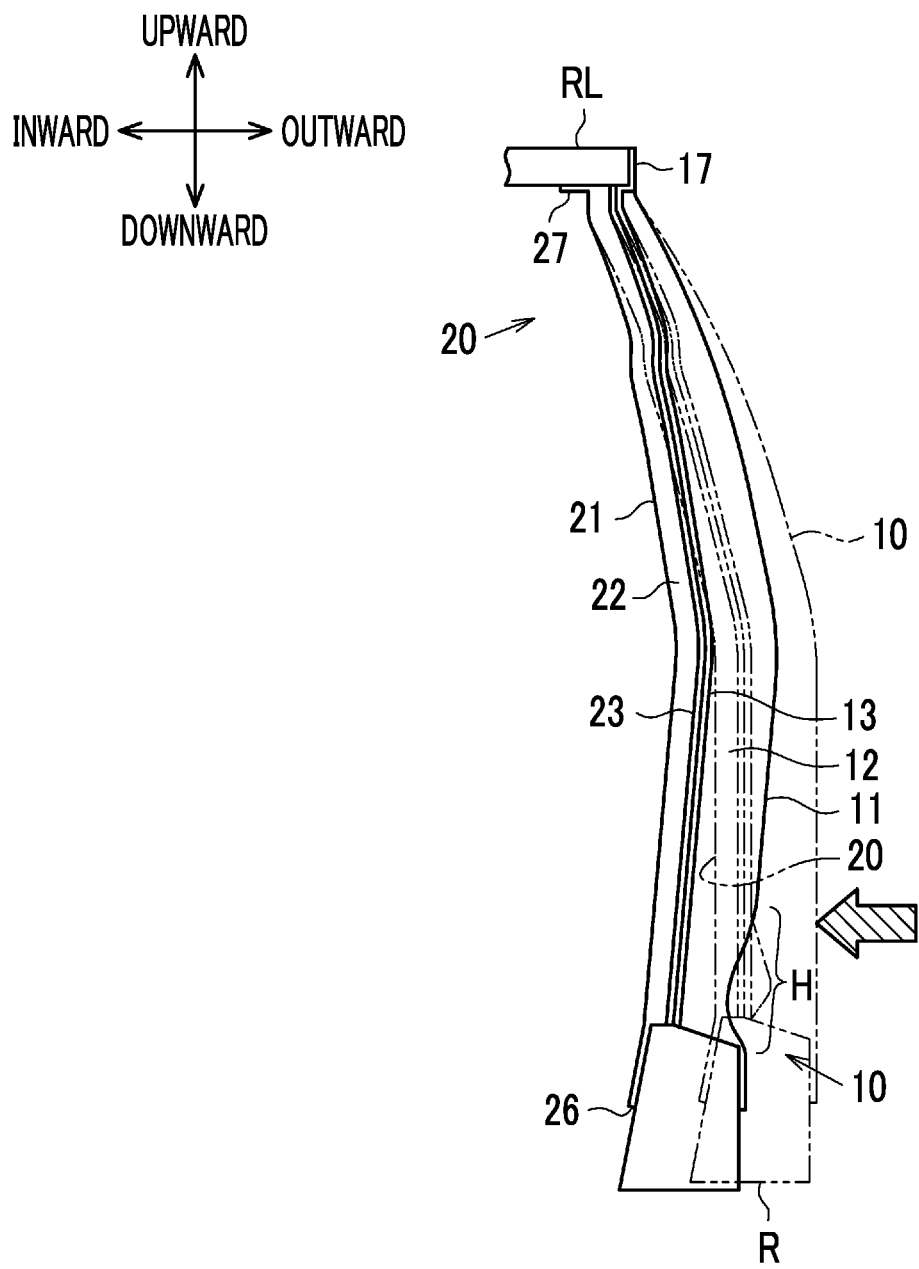
FIG. 6 is a front view showing the mode of deformation of the pillar outer member at the time when the load is applied to the vehicle lateral structure according to the embodiment of the disclosure from outside in the vehicle width direction.

By the way, when a load is applied to the pillar outer member 10 from outside in the vehicle width direction, the pillar outer member 10 may bend at any location thereof in the vertical direction. In general, the upper part of the pillar outer member 10 in the vertical direction is ensured of a corresponding strength to suppress deformation. On the other hand, in the aforementioned embodiment of the disclosure, the flexion regions (the ridge line L1 and the ridge line L2) are provided at the skirt portion H of the pillar outer member 10, and the front lateral wall portion 12 and the rear lateral wall portion 14 are more likely to deform at the skirt portion H than at the other parts. Therefore, even if the pillar outer member 10 bends due to a load from outside in the vehicle width direction, the position of the point of origin of bending thereof is highly likely to be controlled within the range of the skirt portion H that is located on the lower side of the pillar outer member 10. Then, in the case where the pillar outer member 10 bends at the skirt portion H, the pillar outer member 10 deforms in such a manner that a lower end thereof swings inward in the vehicle width direction around an upper end thereof, as shown in FIG. 6. In this mode of deformation of the pillar outer member 10, although a lower side of a vehicle interior space may narrow, an upper side of the vehicle interior space can be restrained from narrowing. Incidentally, in FIG. 6, the pillar outer member 10 and the pillar inner member 20, which have not deformed yet, are indicated by virtual lines. Besides, the shape of the pillar outer member 10 that has deformed at the skirt portion H is schematically depicted, and the degree of inward deformation of the pillar outer member 10 and the like in the vehicle width direction is depicted in an exaggerated manner.

Besides, the pillar outer member 10 deforms as described above. Thus, when another object collides with the pillar outer member 10 from outside in the vehicle width direction, collision energy can be absorbed through deformation of the pillar outer member 10, and the top board of the vehicle, the rail outer piece RL, and the rocker portion R can be restrained from deforming. Therefore, when another object collides with the pillar outer member 10 from outside in the vehicle width direction, the top board of the vehicle, the rail outer piece RL, and the rocker portion R can be restrained from moving toward the vehicle interior.

Then, a series of effects of the aforementioned embodiment of the disclosure can be obtained even when, for example, a reinforcing member or the like is not added. It is therefore possible to contribute toward restraining the weight of the vehicle from increasing and restraining the cost of the vehicle from rising.

The aforementioned embodiment of the disclosure can be changed as follows. The pillar outer member 10 and the pillar inner member 20 do not need to be fixed to the rocker portion R and the rail outer piece RL, as long as they extend from the lower side of the vehicle toward the upper side of the vehicle as a whole. For example, when the art regarding the pillar outer member 10 and the pillar inner member 20 according to the aforementioned embodiment of the disclosure is applied to a front pillar (an A-pillar), the lower ends of the pillar outer member 10 and the pillar inner member 20 are connected to parts different from the rocker portion R, such as an apron upper member or the like in a frame structure of the vehicle.

The width of the outer wall portion 11 of the pillar outer member 10 in the longitudinal direction of the vehicle is not absolutely required to be set as in the aforementioned embodiment of the disclosure. For example, the width of the outer wall portion 11 in the longitudinal direction of the vehicle may be constant over the entirety thereof in the vertical direction of the vehicle. Incidentally, if the width of the outer wall portion 11 in the longitudinal direction of the vehicle is set in a certain manner, the skirt portion H that is extended in the shape of an arc in such a manner as to be located outward in the longitudinal direction of the vehicle as the front lateral wall portion 12 and the rear lateral wall portion 14 of the pillar outer member 10 extend downward may not be formed. Even in this case, effects similar to those of the aforementioned embodiment of the disclosure can be exerted as long as the flexion regions (the ridge line L1 and the ridge line L2) are provided in such a manner as to stretch as far as the lower ends of the front lateral wall portion 12 and the rear lateral wall portion 14 of the pillar outer member 10 respectively.

The pillar inner member 20 may assume any shape as long as the pillar inner member 20 is located inside the pillar outer member 10 in the vehicle width direction and fixed to the pillar outer member 10. For example, the protrusion strip portion 21a may be removed from the inner wall portion 21 of the pillar inner member 20. Besides, the entire pillar inner member 20 may assume the shape of a flat plate.

The flange portions 13 and 15 of the pillar outer member 10 and the flange portions 23 and 25 of the pillar inner member 20 are not absolutely required to be fixed to each other respectively through welding. For example, these flange portions may be fixed to each other respectively using bolts or the like instead of or in addition to being fixed to each other respectively through welding.

At the front lateral wall portion 12 of the pillar outer member 10, the inner part 12b is not absolutely required to be inclined with respect to the outer part 12a in the direction described in the aforementioned embodiment of the disclosure. That is, the inner part 12b may be inclined with respect to the outer part 12a inward in the vehicle width direction and backward. In this respect, the same holds true for the rear lateral wall portion 14. The inner part 14b may be inclined with respect to the outer part 14a inward in the vehicle width direction and forward.

The flexion region (the ridge line L1) of the front lateral wall portion 12 and the flexion region (the ridge line L2) of the rear lateral wall portion 14 are not absolutely required to be provided at the skirt portion H. For example, the flexion region of the front lateral wall portion 12 and the flexion region of the rear lateral wall portion 14 may be provided at the central portion of the pillar outer member 10 in the vertical direction of the vehicle instead of or in addition to the skirt portion H of the pillar outer member 10. The location of the pillar outer member 10 where the flexion region is provided is likely to serve as a point of origin of bending of the pillar outer member 10 when a load is applied thereto from outside in the vehicle width direction. Accordingly, in some embodiments, the flexion region is provided at a location that is desired to serve as the point of origin of bending of the pillar outer member 10 when a load is applied from outside in the vehicle width direction, in consideration of the shape, strength and the like of the entire vehicle.

In the aforementioned embodiment of the disclosure, the ridge line L1 of the front lateral wall portion 12 is located toward the center of the flexion region (the skirt portion H) in the vertical direction thereof and outward in the vehicle width direction, and is located upward or downward from the central portion and inward in the vehicle width direction, but the disclosure is not limited thereto. For example, the ridge line L1 of the front lateral wall portion 12 may be located at the same position in the vehicle width direction, at any location of the flexion region in the vertical direction thereof. That is, the mode of extension of the ridge line L1 may be appropriately determined within the half range X2 on the flange portion 13 side, namely, within half of the range X1 from the flange portion 13 and the flange portion 15 to the outer wall portion 11 in the vehicle width direction, in consideration of the overall shape, ease of processing, and the like of the pillar outer member 10 including the skirt portion H. In this respect, the same holds true for the ridge line L2 of the rear lateral wall portion 14.

What is claimed is:

1. A vehicle lateral structure comprising:
   a pillar outer member that extends from a lower side of a vehicle toward an upper side of the vehicle; and
   a pillar inner member that is arranged opposite the pillar outer member in a vehicle width direction, wherein
   the pillar outer member includes
   a plate-shaped outer wall portion that is opposed to the pillar inner member and that extends from the lower side of the vehicle toward the upper side of the vehicle,
   a front lateral wall portion that extends inward in the vehicle width direction from a front edge of the outer wall portion in a longitudinal direction of the vehicle,
   a rear lateral wall portion that extends inward in the vehicle width direction from a rear edge of the outer wall portion in the longitudinal direction of the vehicle,
   a front flange portion that extends forward in the longitudinal direction of the vehicle from an inner edge of the front lateral wall portion in the vehicle width direction, and whose inner surface in the vehicle width direction is fixed to the pillar inner member, and
   a rear flange portion that extends backward in the longitudinal direction of the vehicle from an inner edge of the rear lateral wall portion in the vehicle width direction, and whose inner surface in the vehicle width direction is fixed to the pillar inner member,
   the front lateral wall portion is equipped with a front flexion region that is flexed at a non-end portion thereof in the vehicle width direction and that has a front outer part located outside a ridge line of flexion thereof in the vehicle width direction, and a front inner part located inside the ridge line in the vehicle width direction,
   the rear lateral wall portion is equipped with a rear flexion region that is flexed at a non-end portion thereof in the vehicle width direction and that has a rear outer part located outside a ridge line of flexion thereof in the vehicle width direction, and a rear inner part located inside the ridge line in the vehicle width direction, the ridge line in the front flexion region is located within a half range on a side of the front flange, namely, within half of a range from the front flange portion to the outer wall portion in the vehicle width direction, and the ridge line in the rear flexion region is located within half of a range from the rear flange portion to the outer wall portion in the vehicle width direction.

2. The vehicle lateral structure according to claim 1, wherein the pillar outer member is equipped, in part of a lower side thereof in a vertical direction of the vehicle, with a skirt portion that is extended in a shape of an arc in such a manner as to be located outward in the longitudinal direction of the vehicle as the front lateral wall portion and the rear lateral wall portion extend downward, and the front flexion region and the rear flexion region are provided at the skirt portion in the vertical direction of the vehicle.

3. The vehicle lateral structure according to claim 1, wherein the front inner part is located inward in the vehicle width direction and forward in the longitudinal direction of the vehicle, with respect to the front outer part, and the rear inner part is located inward in the vehicle width direction and backward in the longitudinal direction of the vehicle, with respect to the rear outer part.

4. A vehicle lateral structure comprising:

a pillar inner member that extends from a lower side of a vehicle toward an upper side of the vehicle;

a pillar outer member that is arranged opposite the pillar inner member in a width direction of the vehicle, wherein the pillar outer member includes a plate-shaped outer wall portion that is opposed to the pillar inner member and that extends from the lower side of the vehicle toward the upper side of the vehicle, a front lateral wall portion that extends from a front edge of the outer wall portion in a longitudinal direction of the vehicle toward the pillar inner member in the width direction, a rear lateral wall portion that extends from a rear edge of the outer wall portion in the longitudinal direction toward the pillar inner member in the width direction, a front flange that extends forward in the longitudinal direction from an end portion of the front lateral wall portion on the pillar inner member side in the width direction, and that is fixed to the pillar inner member, and a rear flange that extends backward in the longitudinal direction from an end portion of the rear lateral wall portion on the pillar inner member side in the width direction, and that is fixed to the pillar inner member, at least one of the front lateral wall portion and the rear lateral wall portion has a flexion portion that is flexed at a non-end portion thereof in the width direction, and a ridge line of the flexion portion is located closer to the front flange or the rear flange than the outer wall portion in the width direction.

* * * * *

UNITED STATES PATENT AND TRADEMARK OFFICE
CERTIFICATE OF CORRECTION

PATENT NO. : 10,407,105 B2  
APPLICATION NO. : 15/824652  
DATED : September 10, 2019  
INVENTOR(S) : Kentaro Saito It is certified that error appears in the above-identified patent and that said Letters Patent is hereby corrected as shown below:

In the Specification

In Column 04, Line 52, delete "are" and insert --arc--, therefor.

Signed and Sealed this  
Twenty-ninth Day of October, 2019

Andrei Iancu  
*Director of the United States Patent and Trademark Office*